G. H. BARKER.
MEANS FOR PREVENTING FROST ON TREES AND OTHER VEGETATION.
APPLICATION FILED MAR. 11, 1913.
1,225,394.
Patented May 8, 1917.
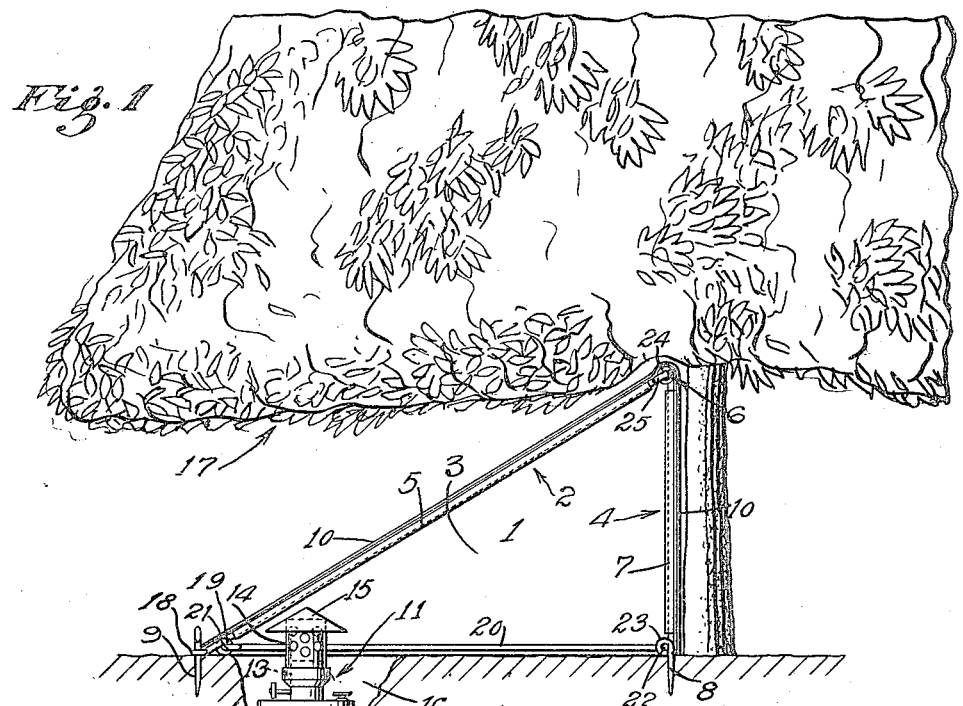
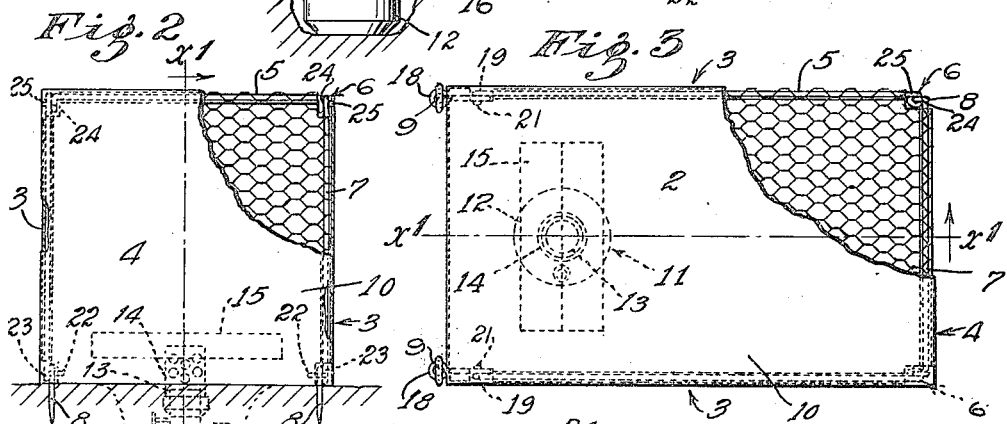
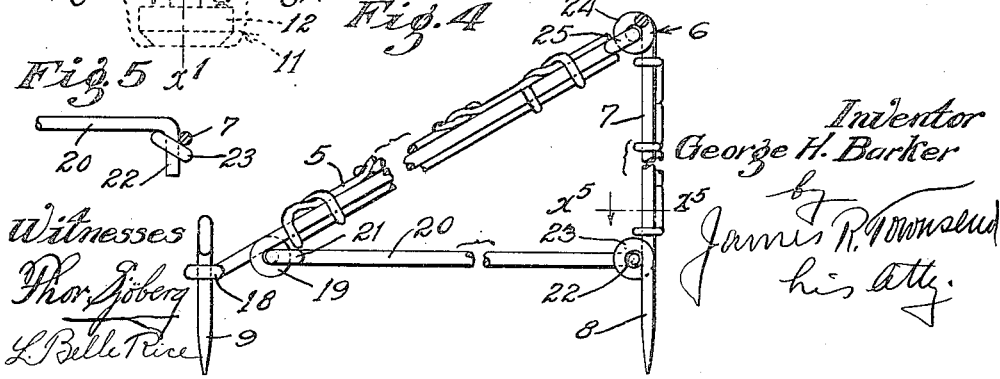
Inventor
George H. Barker

UNITED STATES PATENT OFFICE.

GEORGE H. BARKER, OF PASADENA, CALIFORNIA.

MEANS FOR PREVENTING FROST ON TREES AND OTHER VEGETATION.

1,225,394. Specification of Letters Patent. Patented May 8, 1917.

Application filed March 11, 1913. Serial No. 753,649.

*To all whom it may concern:*

Be it known that I, GEORGE H. BARKER, a citizen of the United States, residing at Pasadena, in the county of Los Angeles and State of California, have invented new and useful Means for Preventing Frost on Trees and other Vegetation, of which the following is a specification.

This invention is designed for use in localities where the temperature is likely to fall to frost point during times of blossoming or fruitage, and an object of the invention is to prevent the tree or plant from being affected by the naturally low surrounding temperature.

Other objects are simplicity, cheapness of operation, convenience of installation and storage, and stability while installed.

Other advantages may appear from the subjoined detail description.

The accompanying drawings illustrate the invention.

Figure 1 is a vertical longitudinal section on line $x^1-x^1$, Figs. 2 and 3, of a device constructed with a view of carrying out this invention and in use to protect a tree.

Fig. 2 is an elevation of the device as viewed from the right in Fig. 1.

Fig. 3 is a plan of the device.

In Figs. 2 and 3 portions of the cover are broken away to expose part of the frame.

Fig. 4 is an enlarged fragmental detail of the wire frame.

Fig. 5 is an enlarged detail in section on line $x^5-x^5$, Fig. 4, omitting the wire mesh.

A chamber 1 is formed with a top 2 permeable to heat and with side walls 3 in the form of right-angled triangles and front 4 which may also be permeable to heat. Said chamber is shown in the drawings in the form of a wedge-shaped inclosure lying on one of its lateral faces open at the bottom, the top 2 being aslant and forming the other lateral face of the inclosure. For convenience and cheapness of construction, installation and storage, the top 2 and front 4 are formed with wire frames, the top frame 5 being hinged at 6 to the front frame 7, each having at the bottom points 8, 9 to enter the ground to hold the parts in relative position and to hold the chamber stationary. Over the frame thus produced, a permeable distributing element 10 is applied, the same being in the form of a cover made of some suitable material permeable to and capable of radiating heat. Said cover may, for example, be fabric, such as cheese-cloth, canvas, muslin, or other material capable of preventing immediate ascension, wide dispersion and rapid escape of heat by draft therethrough, yet permitting slow escape of heat by radiation. Inside the chamber 1 is provided a suitable heating device 11 capable of supplying to the chamber a requisite amount of heat for the purpose in hand. Such heater may be of any desired and convenient character, as an electric heater, oil stove, or lamp. In the drawings a lamp is shown for this purpose as the same may commonly be found most convenient. Said lamp heater comprises an oil receptacle 12, a wick 13 and sheet metal chimney 14 provided at its top with a distributer in the form of a shield or deflector 15 that is designed to protect the covering above the heater from destruction by direct heat from the chimney 14 and also to distribute the heat across the chamber at the lower end thereof, so that as the heat rises from the distributer 15 it may flow up the sloping top or roof thus escaping more or less through such top or roof as well as at the sides evenly and slowly, thereby distributing the heat over considerable area beneath the tree or where required.

In practical use the heater 11 will be placed close to the ground at a required position and will be put into operation by lighting a wick in case the heater is a lamp, and the chamber will then be placed over the heater and brought into its upright and extended position, shown in Figs. 1 and 2. The chamber may be tilted to give access to the heater as required, so that the lamp may be placed, filled, removed, lighted or extinguished without removing the distributing chamber.

The heaters may be installed throughout an orchard, for instance, one or more underneath each tree, and when frost conditions are imminent the heaters will be put into operation and the heat therefrom rising up the sloping top 2 will permeate the same and be distributed gently up through the tree, and as the air under the cover becomes cool it will drop down at the higher front end of the chamber and then circulate back to the heater, where it again becomes heated and rises close up along the slanting top and so on. Sufficient escape of the gaseous products of combustion and displacement of the same by fresh air will continue through the woven fabric to supply oxygen for combustion in the heater. Where an electrical heater is used, there will be no consumption of oxygen.

The points 8, 9 enter the ground sufficiently to support the frame and cover against wind that may occur while the apparatus is installed.

The cover being made of cloth is folded, and the frames fold against each other, thus minimizing the space required to contain the apparatus during transportation or storage.

It is understood that the cover may be of sheet metal, paper, or composition if desired, and in such cases it may be found necessary to provide openings as substitute for the pores of woven fabric in order that sufficient escape of air may occur to allow inflow of oxygen to support the flame. In the drawings the heater is shown located in a pit 16 dug into the ground at the lower end of the chamber, thus to allow the heater to be put to the lowest point with unnecessary extension of the chamber above ground, any desired number of heaters being placed underneath each tree 17. In the drawings it is assumed that the prevailing direction of the wind, if any, is from the left, so that the drift of heated air will be upward through the tree.

The points 9 at the lower edge of the chamber are preferably separate pins driven through coils 18 formed in the frame 5. Other coils 19 are also preferably formed in said frame 5, and a stay rod 20 provided with eyes 21 is caught in the coil 19 and said stay rod is provided at its other end with a finger 22 caught in loops 23 formed in the frame 7 just above the pins 8. The upper end of the frame 7 is provided with loops 24 through which eyes 25 on the upper end of the frame 5 are caught, said eyes 25 being formed of the wire which constitutes the frame 5.

The members of the frame being hinged together and in folded relation to each other enable the attendant to collapse the frame for convenience in storage and transportation and the cover usually being of flexible fabric can be folded and thus brought into compact form and may be unfolded and placed on the frame where it will be supported by the wire mesh which is preferably quite coarse, the object thereof being simply to afford suitable support for the flexible cover.

The invention is regarded as broadly including a heater and a portable chamber containing the same; the chamber being permeable to heat and adapted to confine air and to allow circulation of air therein to and from the heater, and having a top that is permeable to heat so that the heat from the heater will be distributed and caused to escape and radiate slowly, said chamber being variously constructed to suit the various conditions and being adapted to be easily moved from place to place and to be located beneath a tree or close to vegetation that is to be protected from frost.

I claim:—

1. A portable foldable frame having side walls and a front wall, a top inclined downward from the front wall to the ground, means for detachably securing the frame to the ground, said frame being covered with a fabric permeable to heat, and a heater within the inclosure and located beneath the top at its lower end.

2. A device as described having a vertical rectangular front wall, triangular side walls, and a top inclined downward from the front wall to the ground, a heater within said inclosure at the lower end thereof, a deflector for said heater extending beneath the top at its lower end, and a cloth fabric permeable to heat, covering the inclosure.

3. A device as described having a vertical rectangular front wall, triangular side walls, and a top inclined downward from the front wall to the ground, said walls being formed from a heat fabric, a heater within said inclosure, and a deflector for the heater extending beneath said top at its lower end.

4. A device of the character described comprising a chamber having a vertical rectangular front wall, side walls in the form of right angled triangles, a slanting cloth top permeable to heat, a heater in said chamber at the lower portion of the top; and means for deflecting the heat across said lower portion of the top.

5. A device of the character described comprising a portable foldable frame having a vertical front wall, triangular side walls, a top sloping from the front wall to the ground, means for detachably securing the frame to the ground, said frame being covered with a fabric permeable to heat, said frame and cover forming a wedge shaped inclosure, a heater within the inclosure at its lower end; and means for deflecting the heat across said lower end.

In testimony whereof, I have hereunto set my hand at Los Angeles, California, this 5th day of March, 1913.

GEORGE H. BARKER.

In presence of—
JAMES R. TOWNSEND,
L. BELLE RICE.